United States Patent [19]
Nordskog

[11] Patent Number: 4,679,662
[45] Date of Patent: Jul. 14, 1987

[54] LIGHTWEIGHT AIRCRAFT FURNITURE CASTER ASSEMBLY HAVING A NOTCHED BRAKING PLATE ENGAGED BY A BRAKE

[76] Inventor: Robert A. Nordskog, 18135 Karen Dr., Tarzana, Calif. 91356

[21] Appl. No.: 796,066

[22] Filed: Nov. 8, 1985

[51] Int. Cl.⁴ .............................................. B60B 33/00
[52] U.S. Cl. .................................. 188/1.12; 16/35 R; 16/46; 188/19; 188/31; 188/71.1
[58] Field of Search ............... 16/45, 47, 46, 35 R, 16/18 A, 18 R; 244/110 H; 188/1.12, 19, 71.1, 72.9

[56] References Cited

U.S. PATENT DOCUMENTS

| | | | |
|---|---|---|---|
| 2,022,347 | 11/1935 | Hoerle | 16/45 |
| 2,943,889 | 7/1960 | Woldring et al. | 16/45 |
| 3,072,169 | 1/1963 | Hastings, Jr. | 16/46 |
| 3,461,480 | 8/1969 | Sheahan | 16/18 R |
| 3,628,214 | 12/1971 | MacKay | 16/46 |
| 4,295,256 | 10/1981 | Pascal | 16/45 |

*Primary Examiner*—Fred Silverberg
*Attorney, Agent, or Firm*—John J. Posta, Jr.

[57] ABSTRACT

The lightweight caster assembly, when used on aircraft food and drink-dispensing push carts and other aircraft furniture, in place of conventional caster assemblies, reduces the overall weight of the aircraft furniture, thus resulting in a considerable fuel saving. Moreover, the caster assembly is inexpensive to make and install and is durable. It includes a caster wheel of lightweight metal or plastic and a generally inverted U-shaped support bracket or yoke. The wheel has transverse cut-out portions as well as transverse passageways through which metal or plastic reinforcing rods are inserted. The wheel axle passageway is lined with removable lightweight metal or plastic reinforcing and aligning sleeves. A lightweight metallic braking plate with a notched outer periphery may be releasably secured to one side of the wheel, against which a braking mechanism connected to a push cart can releasably bear to brake and stop the wheel from turning and to lock the wheel in the stationary position. The wheel bracket can be fixedly or swivably mounted to the aircraft furniture.

5 Claims, 12 Drawing Figures

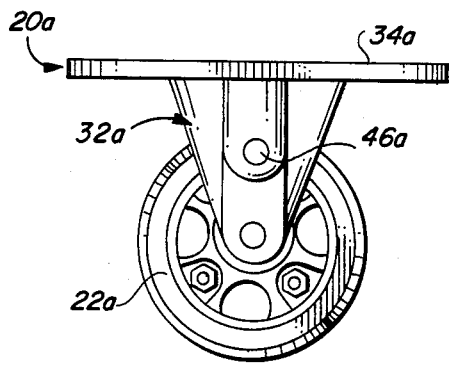
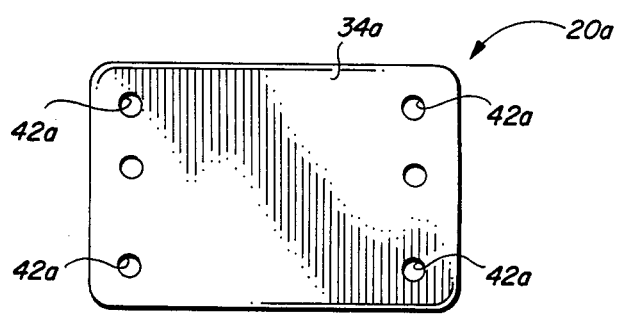
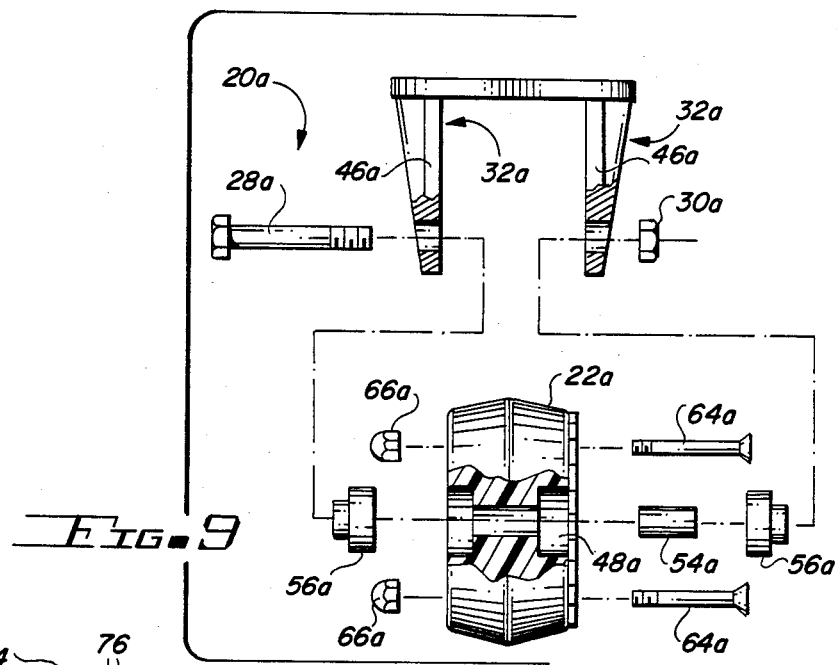
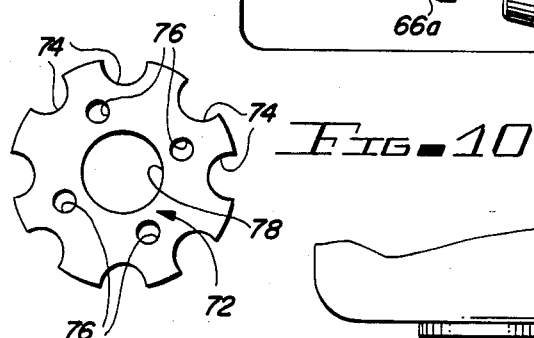
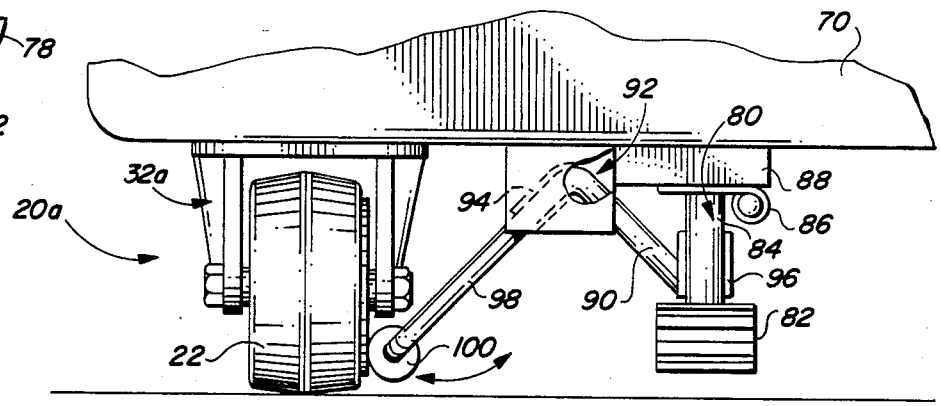

LIGHTWEIGHT AIRCRAFT FURNITURE CASTER ASSEMBLY HAVING A NOTCHED BRAKING PLATE ENGAGED BY A BRAKE

BACKGROUND OF THE INVENTION

1. Field of the Invention

The present invention generally relates to furniture components and, more particularly, to an improved lightweight aircraft furniture caster assembly.

2. Prior Art

Conventional commercial aircraft food and drink-dispensing push carts, storage carts, wheeled chairs and the like bear caster assemblies which are relatively heavy and cumbersome and include steel wheels and brackets and the like. It has been found that such assemblies considerably increase the weight of furniture to which they are attached, and in most cases have strengths which greatly exceed their real needs. The extra weight of the caster assemblies significantly increases the aircraft load and thus the aircraft fuel requirements and ultimately the costs of operating the aircraft.

Commercial airlines are particularly cost conscious because of the high cost of jet fuel and the intense competition between the various airlines for passengers. Passenger preferences in many instances hinge on the relative fare rates and these are ultimately controlled, in part, by the flight cost, including aircraft fuel consumption.

There is a current need for improved fuel conservations, because of incipient fuel shortages, as well as requirement of airlines to compete economically for passengers. There consequently is a need for an improved aircraft furniture caster assembly which will reduce aircraft fuel costs substantially. The assembly should be capable of being provided in various sizes and styles to fit various types of aircraft furniture.

SUMMARY OF THE INVENTION

The improved aircraft furniture caster assembly of the present invention satisfies the foregoing needs. The assembly is substantially as set forth in the Abstract. Thus, it comprises a lightweight wheel of plastic such as glass-reinforced nylon and/or polypropylene or of a lightweight metal such as aluminum or magnesium or a combination thereof. The wheel is releasably rotatably secured in an inerveted generally U-shaped support bracket of similar lightweight material.

In one embodiment the wheel has large transverse cut-away portions to substantially reduce its weight, and contains transverse passageways in which reinforcing rods are disposed to increase its load-bearing capacity, dimensional stability and overall strength. The rods may be threaded bolts which can also be used to hold a peripherally notched, circular, metallic braking plate against one side of the wheel. A braking mechanism such as a spring-loaded foot pedal-actuated arm bearing a friction roller may also be mounted on a push cart to which the caster assembly is connected, and can be used to slow, stop and lock the wheel.

Reinforcing inserts of metal, low friction plastic or the like may be releasably disposed in the central transverse axle passageway in the wheel to help align the wheel axle therein, facilitate turning of the wheel and strengthen the wheel. Further features of the improved caster assembly are set forth in the following detailed description and accompanying drawings.

DRAWINGS

FIG. 7 is a schematic side elevation, partly broken away, of a second preferred embodiment of the improved lightweight aircraft furniture caster assembly of the present invention;

FIG. 8 is a schematic top plan view of the bracket of the assembly of FIG. 7;

FIG. 9 is a schematic front exploded view, partly broken away, of the assembly of FIG. 7;

FIG. 10 is a schematic side elevation of the braking plate of the assembly of FIG. 7; and, FIG. 11 is a schematic front elevation of the assembly of FIG. 7, showing the assembly attached to the underside of an aircraft food and drink dispensing push cart, with a wheel-braking mechanism also connected to the cart and releasably bearing against the braking plate of the caster assembly.

DETAILED DESCRIPTION

FIGS. 1-6

Figure 1:
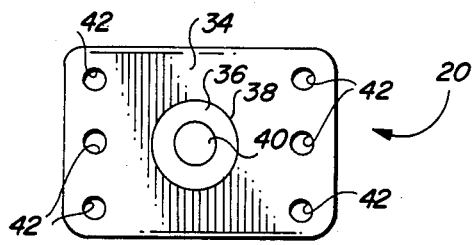
FIG. 1 is a schematic top plan view of tbe connector plate portion of a first preferred embodiment of the improved aircraft furniture caster assembly of the present invention.

Now referring more particularly to FIGS. 1-6 of the accompanying drawings, a first preferred embodiment of the improved, lightweight aircraft furniture caster assembly is schematically depicted therein. Thus, assembly 20 is shown. It is adaptable for use with all types of aircraft furniture and other furniture, including push carts, storage carts, and wheeled beds, chairs and tables, as well as other furniture items and the like.

Assembly 20 comprises a wheel 22, which is fabricated of lightweight material preferably selected from the group consisting of aluminum, magnesium, plastic, glass and mixtures thereof. In one preferred embodiment, the outer rim 24 of wheel 22 is formed of glass fiber-reinforced nylon while the central core 26 thereof which is bonded thereto may be of, for example, polypropylene, polystyrene or the like. If desired, wheel 22 could be fabricated of the same material throughout.

Wheel 22 is of substantial width and is releasably secured, as by a bolt 28 and nut 30 to a generally inverted U-shaped bracket or yoke 32, in turn secured at the upper end thereof to a flat mounting plate 34 by swivel-securing means which may be in the form of a depending sleeve 36 received in an opening 38 in plate 34 and attached to bracket 32. Sleeve 36 has a vertical swivel arm-receiving opening therein so that bracket 32 is supported below and turns freely below plate 34 on such an arm while plate 34 can be fixedly secured to the underside of aircraft furniture (not shown) as by screws (not shown) in vertical openings 42 therein.

Figure 2:
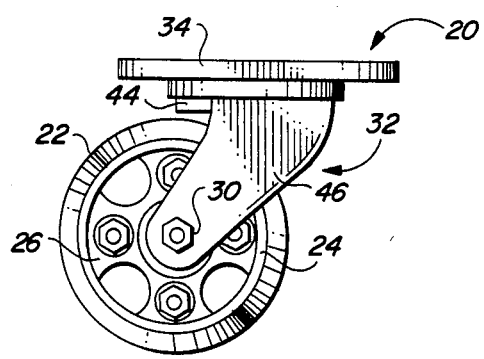
FIG. 2 is a schematic side elevation of the caster assembly referred to in FIG. 1.
Figure 3:
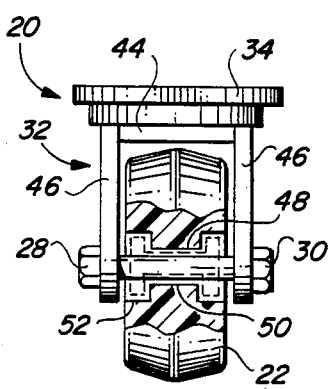
FIG. 3 is a schematic front elevation, partly broken away, of the caster assembly shown in FIG. 2.
Figure 4:
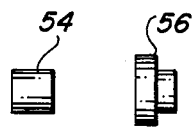
FIG. 4a and FIG. 4b are, respectively, schematic side elevations of a wheel axle passageway central sleeve and a peripheral sleeve for the wheel axle passageway.

It will be noted that bracket 32 includes a top horizontal portion 44 and a pair of spaced parallel depending legs 46 which may be angled (FIG. 2). Bracket 32 and plate 34, as well as bolt 28, nut 30 and sleeve 36, can be of strong material, such as plastic, glass or a light metal such as aluminum, magnesium or the like or a composite thereof.

Bolt 28 acts as an axle and horizontally passes through openings (not shown) in the lower ends of legs 46 and through a horizontal axle passageway 48 in wheel 22. Passageway 48 is dumbbell shaped with a small diameter central portion 50 and larger diameter lateral portions 52. A sleeve 54 (FIG. 4a) is releasably disposed in portion 50 and a pair of sleeves 56 (FIG. 4b) are releasably disposed in portions 52. Sleeves 54 and 56 preferably are of lightweight metal such as aluminum or magnesium and/or of slippery plastic material such as polytetrafluroethylene, to act as a guideway for axle bolt 28 and to help strengthen wheel 22 while promoting free turning of wheel 22 relative to axle bolt 28.

Figure 5:
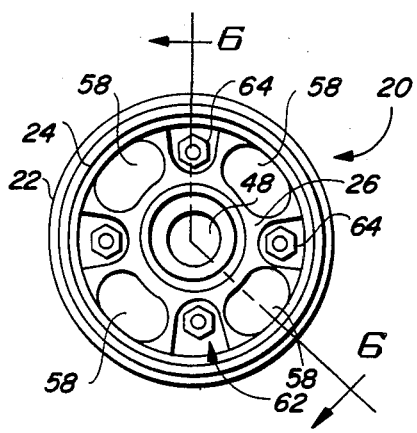
FIG. 5 is an enlarged schematic side elevation of the wheel of the assembly of FIG. 2.
Figure 6:
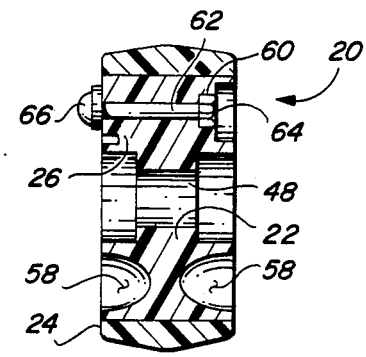
FIG. 6 is an enlarged section taken along the section line 6—6 of FIG. 5.

It will be noted from FIGS. 2, 5 and 6 that wheel 22 has four large symmetrically disposed openings 58 extending transversely therethrough to reduce its weight substantially and has 4 smaller transverse openings 60 extending therethrough in which lightweight reinforcing rods 62, preferably of aluminum or magnesium comprising bolts 64 with nuts 66, are secured to dimensionally stabilize and strengthen wheel 22. Accordingly, wheel 22 is both strong and light, utilizing a minimum of material strategically placed. Assembly 20 substantially reduces aircraft flight fuel costs and is inexpensive to make, easy to install, durable and effective.

FIGS. 7-11

A second preferred embodiment of the improved lightweight aircraft furniture caster assembly of the present invention is schematically depicted in FIGS. 7-11. Thus, assembly 20a is shown. Components thereof similar to those of assembly 20 bear the same numerals, but are succeeded by the letter "a". Assembly 20a is substantially identical to assembly 20, except that assembly 20a is of the fixed caster type, rather than the swivel caster type. In this regard, swiveling means are omitted and bracket 32a includes in its top portion 44a holes 42a through which screws (not shown) can be placed to mount bracket 32a to the underside of aircraft furniture, such as push cart 70 (FIG. 11). Moreover, spaced vertical depending legs 46a are not angled.

Wheel 22a is similar to wheel 32, as are its components, including bolt 28a, nut 30a, bolts 64a and nuts 66a, sleeve 54a and sleeves 56a, and passageway way 48a. Moreover, a flat circular braking plate 72 having a notched outer periphery 74 is releasably secured to one side of wheel 22 by bolts 64a received through openings 76 in plate 72. Plate 72 is also provided with a central opening 78 matching that of wheel 22a.

FIG. 11 schematically depicts assembly 20a installed on the underside of push cart 70 and with one type of a conventional cart braking mechanism 80 also installed on the underside of cart 70. Mechanism 80 is designed to releasably bear against plate 72 to slow the rotation of wheel 22a, stop such rotation and lock wheel 22a in the stopped position. For example, mechanism 80 may include a foot-operated pedal 82 connected to an arm 84 biased forward by spring 86 and hinged to a support 88.

Movement of arm 84 rearward by pedal 82 against the spring bias causes arm 84 to act upon one arm 90 of a generally inverted U-shaped member 92 held in a channeled bracket 94 attached to the underside of cart 70 and, via a motion translation component 96 connected to arm 84 and member 92, to tilt member 92 such that the other arm 98 of member 92 moves toward plate 72, forcing a rubber ball or roller 100 connected thereto against plate 72 to frictionally engage it and slow, then stop the rotation of wheel 22a. Ball 100 may be dimensioned to fit into a notch 74 of plate 72 so as to lock plate 72 in the stopped position until foot pedal 82 is released and spring 86 biases arm 80 forward, causing arm 98 and ball 100 to pivot away from plate 72.

It will be understood that any other suitable braking arrangement utilizing braking plate 72 can be employed in place of that described above. In any event, assembly 20a is light in weight durable, efficient and compact. The caster assembly of the present invention can be used with furniture other than aircraft furniture, if desired.

Various other modifications, changes, alterations and additions can be made in the improved lightweight aircraft furniture caster assembly of the present invention, its components and their parameters. All such modifications, changes, alterations and additions as are within the scope of the appended claims form part of the present invention.

What is claimed is:

1. An improved lightweight aircraft furniture caster assembly, said assembly comprising, in combination:
    (a) a lightweight aircraft furniture caster wheel consisting essentially of lightweight material, said wheel having transverse cut-away portions to reduce the overall weight of said wheel; and,
    (b) a generally inverted U-shaped lightweight caster wheel support bracket releasably connected to said wheel for free rotation of said wheel, said bracket consisting essentially of lightweight material wherein said wheel includes a plurality of spaced passageways symmetrically disposed around a central hub of said wheel, and extending transversely and completely through said wheel, said passageways having reinforcing rods releasably secured therein to dimensionally stabilize and strengthen said wheel;
    (c) wherein said assembly includes braking means and a lightweight braking plate releasably connected to said wheel wherein said breaking plate is metallic, is generally circular, has two side surfaces and an outer periphery and includes semicircular notches at said outer priphery, said wheel having two sides, said braking plate being secured by said reinforcing rods to one of the sides of the wheel, a separate braking mechanism releasably bears against one of the side surfaces of the braking plate, wherein said one of the side surfaces faces in the same direction as said one of said sides, said braking mechanism comprising an element which frictionally engages said one of said side surfaces to slow the rotation of said wheel, said element fits within one of the notches to lock the wheel in a stopped position.

2. The improved lightweight aircraft furniture caster assembly of claim 1 wherein said wheel hub has a transverse axle passageway therethrough and wherein said axle passageway is lined with removable reinforcing sleeve inserts.

3. The improved lightweight aircraft furniture caster assembly of claim 2 wherein said axle passageway is generally dumbbell shaped, the lateral portions thereof being of greater diameter than the medial portion thereof, and wherein two of said inserts are dimensioned to rest in said lateral portions of said axle passageway and wherein said inserts are in intimate contact with said wheel so as to act as strength-reinforcing axle guides.

4. The improved lightweight aircraft furniture caster assembly of claim 1 wherein said bracket is adapted to be fixedly secured to the underside of an aircraft food and drink-dispensing push cart.

5. The improved lightweight aircraft furniture caster assembly of claim 1 wherein said wheel comprises an outer rim of glass-reinforced nylon connected to a central core portion comprising polyurethane.

* * * * *